Patented Aug. 10, 1926.

1,595,375

UNITED STATES PATENT OFFICE.

PAUL BEEBE, OF AKRON, OHIO, ASSIGNOR TO THE GOODYEAR TIRE & RUBBER COMPANY, OF AKRON, OHIO, A CORPORATION OF OHIO.

METHOD OF MAKING RUBBERIZED FIBROUS MATERIAL.

No Drawing.     Application filed March 2, 1923. Serial No. 622,453.

My invention relates to the manufacture of rubberized fibrous material which is intended chiefly as a substitute for leather, but which may be employed for various other purposes for which leather is not suitable.

More particularly my invention relates to one step of the method of manufacture of material of the character in question which comprises the removal and the simultaneous felting of the fibers, from a liquid in which they are suspended.

The object of my invention is to provide an improvement in the process of manufacturing which shall materially increase the speed of manufacture and which shall produce a product having qualities superior to those possessed by products manufactured in accordance with the methods of manufacture which have heretofore obtained.

Heretofore, it has been customary, in the manufacture of material of the character described, to disperse a quantity of beaten fibers in a mixture which contains rubber in solution. After the fibers have been thoroughly distributed throughout the liquid the rubber in the solution is precipitated thereupon, either by the addition of a suitable precipitating agent or by properly regulating the temperature of the solution.

The fibers, provided with their individual coatings of rubber, are then removed from the liquid in which they are suspended by causing the liquid to pass through a screen, either a stationary screen or a movable screen such as employed in Fourdrinier machines, as commonly used in the manufacture of paper. The first portion of the liquid which passes through the screen deposits a layer of fibers thereon, thus partially clogging the screen. The remaining liquid gradually builds up a deposit of fibers, thus rendering the passage of the liquid therethrough progressively more difficult. If the material being manufactured is to be relatively thick, considerable time is occupied in the draining of the liquid therefrom. Also there is a tendency for a channeling action by the liquid passing through the fibers deposited upon the screen which renders the construction of the material non-uniform.

In order to pass the liquid through the material, at even a reasonable rate of speed it is necessary that the suction or pressure employed, as the case may be, be relatively high. This interferes with the natural felting of the fibers and serves to increase the possibility of channeling by the liquid. After the liquid has been removed from the fibers, they are pressed to any desired shape and, if desired, vulcanized.

My present invention relates to an improvement on the hereinbefore described method of separating the fibers from the liquid. By my invention I agitate or churn the liquid containing the fibers by passing it through a centrifugal pump, preferably of the paddle type, or the like until sufficient aeration of the fibers is produced to cause the fibers to rise to the top of the liquid in the form of a clot. It is believed that any vigorous churning action will produce the proper aeration of the fibers. The effect of the aeration is to cause very small particles of air to adhere to the fibers, thus buoying them upwardly. As the fibers are all carried to the top of the liquid they move into a naturally felted relationship with each other.

In the stationary screen device, after the fibers are collected at the top of the liquid, an outlet valve in a conduit connected to the bottom of the tank in which the liquid is contained is opened, thus drawing off through a screen, first the liquid in the lower part of the tank which has been cleared of the fibers by the aerating process and subsequently causing the fibers themselves to settle upon the screen, and drawing off the remaining liquid in which they were suspended. It will be understood that the portion of the liquid which suspends the fibers will drain at a lower rate than does the portion which is clear of the fibers on account of the screen being partially closed by the fibers. However, as the portion of the liquid which bears the fibers is but a very small fraction of the total liquid, it will be obvious that but a very small amount of time is consumed in draining it off, as compared with the method heretofore employed in which the screen is gradually clogged from the very first of the drainage period.

It will be apparent from the foregoing description that I have very materially reduced the time required for draining liquid from the fibers and that the natural matting or felting of the fibers during their rise to the top of the mixture will be effected much more naturally, and therefore better than if it be effected by the method described in connection with the former process. In the description of my invention I have used the term "aeration" to means the process of changing the apparent specific gravity of the suspended material which will result in its being buoyed to the surface of the suspending medium. The reason for this change in physical properties is not clearly understood. It may or may not be due to the adsorption or inclusion of air particles.

The aeration of the fibers requires but a relatively short time and, if desired, may be carried on during the time which is also employed for the deposition of the rubber coatings on the fibers by precipitation.

Although I have described in detail but a single form of my invention it will be apparent to those skilled in the art that it is not so limited but that various minor modifications and changes may be made therein without departing from the spirit of my invention, or from the scope of the appended claims.

What I claim is:

1. The method of treating rubberized fibers in a liquid suspension which comprises churning the mixture until it is sufficiently aerated to cause the fibers to rise to the top thereof.

2. The method of removing rubberized fibers from a liquid which comprises aerating the fibers so as to cause them to segregate themselves, and draining away the cleared liquid.

3. The method of removing rubberized fibers from a liquid which comprises aerating the fibers in order to buoy them to the top of the liquid, and draining away the bottom part of the liquid first, and subsequently draining away the top portion thereof.

4. A method of treating a suspended rubberized fibrous composition which comprises vigorously agitating the same, allowing the material to segregate and draining off the suspending medium.

5. A method of treating a suspended rubberized fibrous composition which comprises vigorously agitating the suspension, allowing the material to segregate in felted relationship at the surface thereof and draining off the suspending medium.

In witness whereof, I have hereunto signed my name.

PAUL BEEBE.